Aug. 18, 1964  G. H. PATTON  3,145,253
COLLAPSIBLE PLASTIC STEREOSCOPIC VIEWER
Filed May 1, 1961  4 Sheets-Sheet 1

INVENTOR.
George H. Patton
BY
Buckhorn, Cheatham & Blore
ATTORNEYS

Aug. 18, 1964 G. H. PATTON 3,145,253
COLLAPSIBLE PLASTIC STEREOSCOPIC VIEWER
Filed May 1, 1961 4 Sheets-Sheet 2
Fig. 6
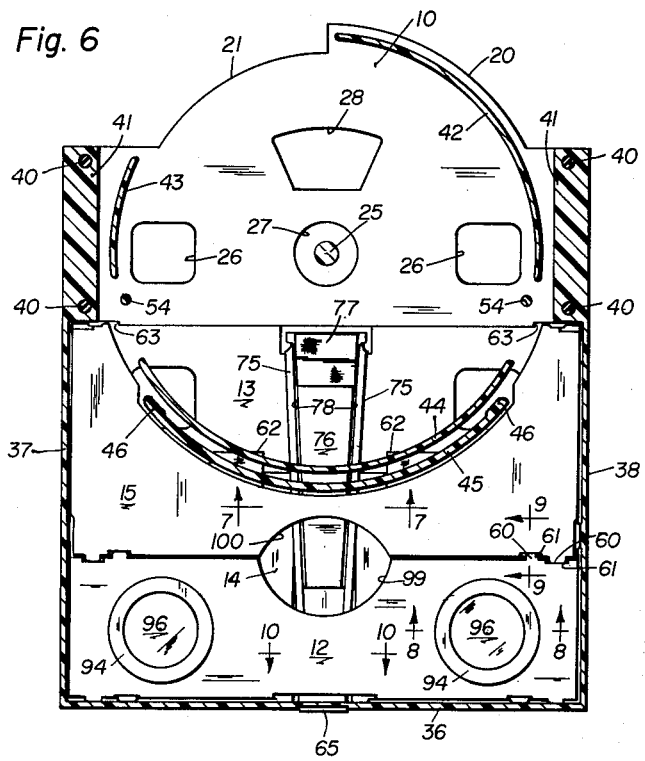
Fig. 9
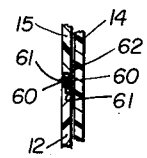
Fig. 7
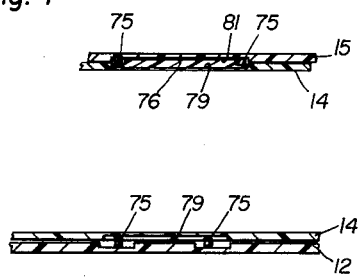
Fig. 8
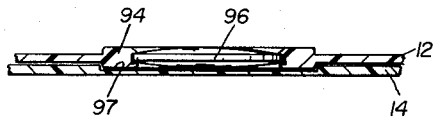
Fig. 10
INVENTOR.
George H. Patton
BY
Buckhorn, Cheatham & Blore
ATTORNEYS Aug. 18, 1964  G. H. PATTON  3,145,253
COLLAPSIBLE PLASTIC STEREOSCOPIC VIEWER
Filed May 1, 1961  4 Sheets-Sheet 3

INVENTOR.
George H. Patton
BY
Buckhorn, Cheatham & Blore
ATTORNEYS

Aug. 18, 1964  G. H. PATTON  3,145,253
COLLAPSIBLE PLASTIC STEREOSCOPIC VIEWER
Filed May 1, 1961  4 Sheets-Sheet 4

INVENTOR.
George H. Patton
BY
Buckhorn, Cheatham & Blore
ATTORNEYS

United States Patent Office 3,145,253
Patented Aug. 18, 1964

3,145,253
COLLAPSIBLE PLASTIC STEREOSCOPIC VIEWER
George H. Patton, Portland, Oreg., assignor to Sawyer's Inc., Progress, Oreg., a corporation of Oregon
Filed May 1, 1961, Ser. No. 106,866
5 Claims. (Cl. 88—29)

My present invention comprises an improvement in collapsible plastic stereoscopic viewers, and constitutes an improvement upon the viewer disclosed and claimed in the application of Kenneth E. Golden, Serial No. 857,698, filed December 7, 1959, now Patent No. 3,005,378, issued October 24, 1961, which patent is owned by the assignee hereof.

A principal object of the present invention is to provide a collapsible viewer of the character described which may be erected into operative condition without intricate manipulation of the various parts. The viewer disclosed in the above identified application comprises a number of parts which may be folded upon each other to provide a flat package, or extended to provide an operative stereoscopic viewer, several parts of which must be carefully interlocked with each other in order to use the viewer. Such operations entail careful attention, and careless or immature users of the viewer are prone to force parts and break them. The present invention may be erected or collapsed by simple manipulations well within the capacity of such persons.

A further object of the present invention is to provide a viewer of the foregoing character which is easily assembled.

A further object of the present invention is to provide a device of the foregoing character in which means are provided to assure correct alignment of viewing lenses of the viewer with the transparencies being viewed, in order to provide sharply defined, clear views and prevent eyestrain and headaches which may result from misalignment.

A further object of the present invention is to provide means of the foregoing character which may be mailed in ordinary envelopes or paper wrappers as a promotional device, the collapsed viewer enclosing and protecting a flat carrier of transparencies depicting an article being promoted. This object is achieved by providing a viewer which is so inexpensive that it may be utilized for this purpose, is so sturdy that it will safely arrive at its intended destination, and which will pleasingly and realistically depict the promoted article. The value of the present invention is further enhanced in that the device provides means whereby a recipient may substitute other holders of transparencies, just as with a conventional stereoscopic viewer.

A further object of the present invention is to provide means of the foregoing character which may be collapsed and stored along with collections of transparencies, the device occupying a minimum amount of space when so collapsed. Thus the convenient storage of a collapsed viewer along with a collection of transparencies in pockets within the front and back covers of bound books or booklets provides for the combining of text, stereoscopic illustrations and viewing device all into compact units.

The objects and advantages of the present invention will be more readily apparent from inspection of the following specification, taken in connection with the accompanying drawings, in which like numerals refer to like parts throughout.

In the drawings,

FIG. 6 is a vertical section taken substantially along line 6—6 of FIG. 3;

FIG. 7 is a vertical section, on an enlarged scale, taken substantially along line 7—7 of FIG. 6;

FIG. 8 is a vertical section, on an enlarged scale, taken substantially along line 8—8 of FIG. 6;

FIG. 9 is a vertical section, on an enlarged scale, taken substantially along line 9—9 of FIG. 6;

FIG. 10 is a vertical section, on an enlarged scale, taken substantially along line 10—10 of FIG. 6;

Figure 1:
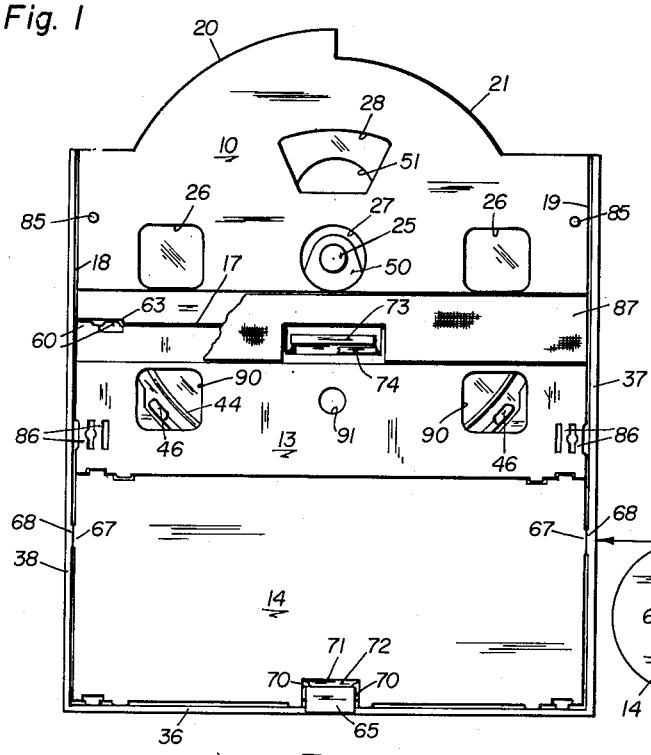
FIG. 1 is a front view of the viewer in collapsed condition, with parts broken away for clarity.
Figure 3:
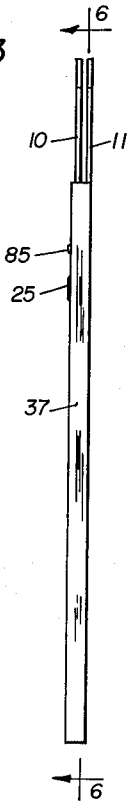
FIG. 3 is a side view of the viewer in collapsed condition.
Figure 13:
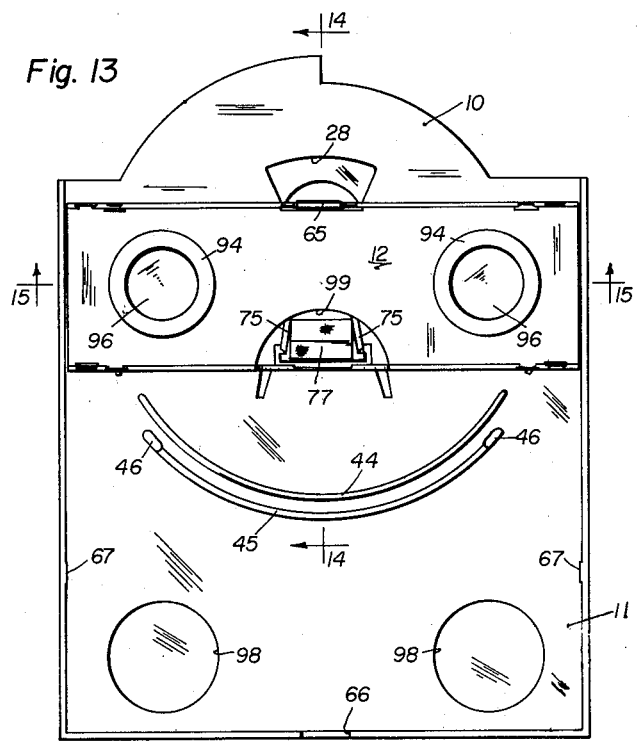
FIG. 13 is a front view of the viewer in operative condition.
Figure 14:
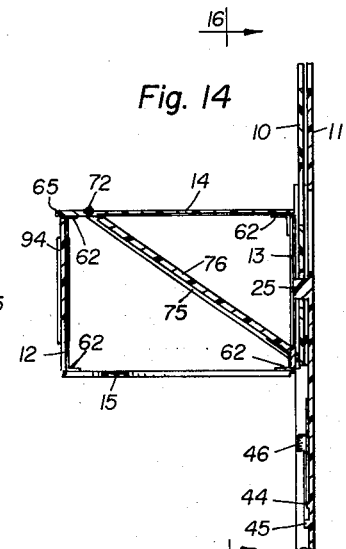
FIG. 14 is a vertical section taken substantially along line 14—14 of FIG. 13.

The viewer of the present invention comprises a carrier holding portion including a pair of molded plastic, platelike members, said members including a front member 10 and a rear member 11. The viewer also comprises a collapsible lens-carrying housing of rectangular cross-section hingedly secured to said carrier holding portion, said housing comprising four molded plastic plates hingedly secured to each other along their adjacent edges, said plates including a front plate 12, a rear plate 13, a top plate 14 and a bottom plate 15. The four plates are hingedly secured together along adjacent edges, by means to be described, in such manner that they may be folded together against the lower portion of the rear housing member 11, as illustrated in FIGS. 1, 3 and 6, or formed into an open-ended, rectangular housing and swung into operative position, as illustrated in FIGS. 13 and 14. Means to be described are provided to maintain said housing in said extended condition with said plates at right angles to each other, and means to be described are provided releasably to maintain the housing in collapsed condition, as illustrated in FIG. 1, or in operative condition as illustrated in FIG. 14. The front carrier holding member 10, and each of the housing plates 13, 14 and 15, are formed of opaque, molded plastic. The rear carrier holding member 11 is formed of a translucent milky white molded plastic. The plates and members are sufficiently rigid to retain their shape, but yieldable to permit slight flexing of parts thereof and substantially flexing of long tongues, as will presently appear.

Figure 16:
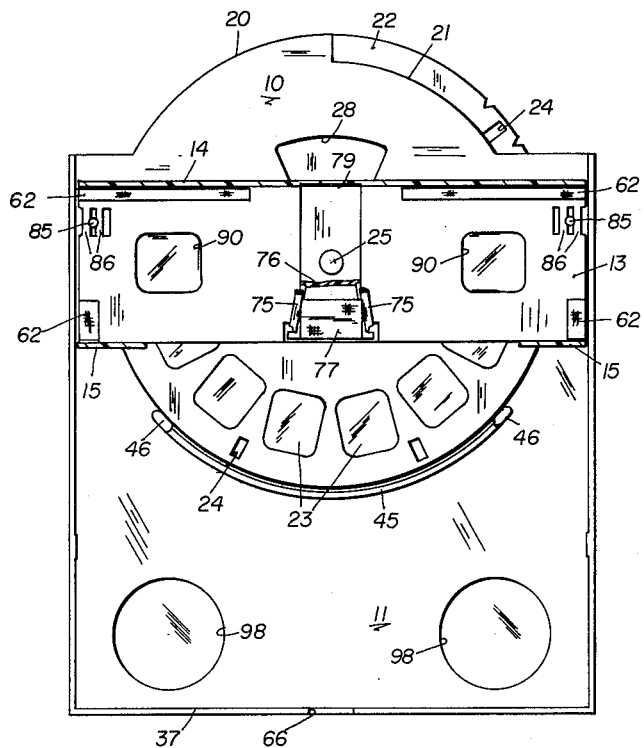
FIG. 16 is a vertical section taken substantially along line 16—16 of FIG. 14, with a transparency holder illustrated in operative position.

The front member 10 comprises a rectangular, relatively narrow, lower portion having a lower edge 17 which extends horizontally from edge to edge and vertical side edges 18 and 19, and has an irregular upper edge including an arcuate edge 20 of large radius and an arcuate edge 21 of lesser radius, the two arcuate edges terminating along the vertical centerline of the plate. The edge portion 20 is of substantially the same radius as that of a flat disc holder 22 for stereo-paired transparencies (FIG. 16), which may be mounted in the carrier holding portion. Such a carrier is illustrated, described and claimed in the patent to Kurz No. 2,571,584, issued October 16, 1951. The carrier holds a concentric row of transparencies 23, and is provided with an eccentric row of equidistantly spaced, rectangular openings 24. The carrier is provided with a concentric small opening (not shown) adapted to receive a spindle lug 25 on the carrier holding portion of the viewer, whereby the carrier is mounted for rotation within the carrier holding portion. The member 10 is provided with a pair of substantially rectangular viewing apertures 26 horizontally disposed in such manner as to register with a diametrically mounted stereo-pair of transparencies when in viewing position. The member 10 is provided with a large circular opening 27 through which the spindle lug 25 projects, and above that opening there is a legend viewing window 28 through which descriptive material relating to the transparencies and printed upon the carrier 22 may be read.

The rear carrier holding portion member 11 comprises a substantially rectangular plate having a horizontal lower edge 30, vertical side edges 31 and 32, and an irregular upper edge including an arcuate portion 33 of large diameter and an opposite arcuate portion 34 of lesser diameter. The arcuate portions 33 and 34 register in horizontal alignment with the arcuate portions 20 and 21 respectively, when the two members are assembled. The rear member 11 is provided with a shallow flange 36 extending the width of the edge 30, a shallow flange 37 extending the length of the edge 31, and a shallow flange 38 extending the length of the edge 32. The front member 10 fits between the flanges 37 and 38 and is held in proper relation thereto by integral lugs 40 which pass through registering openings in the rear member 11 and are suitably fastened thereto. A convenient method of fastening is to form the front member 10 of thermoplastic material whereby the tips of the lugs 40 may be softened and spread into clinched engagement with tapered walls of the openings in the member 11 by heated dies. The inner surfaces of the members 10 and 11 are held spaced from each other to define a slot into which the carrier 22 may be inserted, by a pair of vertical ledges 41 (FIG. 6) at the sides of the member 11, upon which the lateral edge portions of the member 10 are seated within the flanges 37 and 38.

The inner surface of the rear member 11 is provided with a plurality of arcuate ribs including a rib 42 (FIG. 6) concentrically situated within the edge 20, a rib 43 toward the opposite side from the rib 42, and a lower rib 44, the ribs being of the same thickness, height and radius and concentric with the lug 25 (FIG. 14). The inner surface of the front member 10 is provided with low, rounded ribs (not shown) in exact opposition to the ribs 42 and 43, thereby holding the opposite surface of the disc spaced from the inner surface of the member 10. The ribs are adapted to engage peripheral portions of an inserted disc 22 so as to minimize frictional resistance to rotation of the disc. The lower portion of the rear member 11 carries a concentric, arcuate rib 45 of greater radius than the adjacent rib 44 and which, for the most part, is of greater internal radius than the radius of the disc carrier 22, but which has a pair of high, wide lugs 46 at its ends, each of which has an inner portion of lesser radius than that of the majority of the rib 45. The lugs 46 thereby provide two small edge bearings for the power edge of the carrier. The rib 45 prevents a person from accidentally bending the lower edge of the carrier when he is using the apparatus, and the high lugs 46 limit insertion of the disc into the slot between the members 10 and 11.

The spindle lug 25 is integral with the upper end of a long, flexible tongue 50 in the rear member 11, which tongue is provided by an inverted U-shaped slot 51 in the member. The upper edge of the tongue 50 may be engaged by a fingernail to flex the tongue rearwardly in order to permit insertion of a carrier until it engages the lugs 46 whereupon release of the tongue causes the spindle lug 25 to enter the central perforation of the carrier. The tip of the spindle lug is preferably rounded at its edges so that the lug will easily enter the spindle opening of the carrier.

Figure 5:
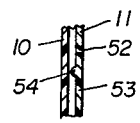
FIG. 5 is a vertical section taken substantially along line 5—5 of FIG. 2.

The member 11 is provided with a laterally spaced pair of downwardly facing, generally inverted U-shaped slots 52 which respectively define a pair of flexible tongues 53, each of which bears a low, rounded locating lug 54 (FIG. 5) near its tip. The lugs 54 are so proportioned and related as to snap into and out of pairs of the openings 24 in the disc carrier as the disc is rotated. The lugs give sufficient resistance to further rotation that the operator, grasping the peripheral portion of the disc carrier which projects beyond the edges 21 and 34, will sense such resistance. The openings 24 are so located with respect to the transparencies 23 that each pair of transparencies may thereby be optically aligned with the viewing openings 26 in the member 10.

Each of the four plates 12, 13, 14 and 15 which make up the collapsible lens housing is substantially rectangular in general outline, and the plates are connected together along their longitudinal meeting edges by suitable hinge means as follows. Each plate is provided with a plurality of pairs of interlocking edge portions, a pair thereof being adjacent each corner. Each of the interlocking edge portions comprises a narrow tongue 60 (FIGS. 6 and 9) which projects beyond the edge, is about half the thickness of the plate, and is receivable in an aligned depression 61 in the edge of the opposite member (FIG. 9). Thus when two plates occupy the same plane when the housing is collapsed as seen in FIGS. 1 and 6, the tongues and depressions of adjacent edges interlockingly engage to prevent lateral shifting of one plate with respect to the adjacent plate, and displacement of either plate from the common plane. This is true with respect to the adjacent edges of plates 13 and 14, and the adjacent edges of plates 12 and 15. When the housing is extended into operative condition the tips of opposed pairs of the tongues 60 engage each other to assist in maintaining the plates at right angles to each other. The hinge means also include suitably positioned strips of adhesive fabric tape indicated at 62 throughout, which are adhered to the inner surfaces of the adjoining edge portions of the plates. The combined action of the interlocking tongues 60 and depressions 61, and of the tapes 62, prevents lateral shifting of the plates with respect to each other, maintains the plates in alignment with each other while moving from extended to collapsed position and return, and aids in maintaining the plates at right angles to each other when the lens housing is in operative, extended condition.

When the lens housing is collapsed, the plates 12 and 15 are in the same plane and lie flush against the lower portion of the rear carrier member 11 in the plane of the slot into which the carrier is inserted, and the plates 13 and 14 lie in the same plane as the front carrier member 10, with the upper edge of the plate 13 abutting the lower edge 17 of the member 10. The corners of the lower edge of the front carrier member are recessed, as indicated at 63, in order to receive the projecting tongues 60 (FIGS. 1 and 6).

Figure 4:
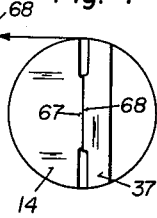
FIG. 4 is an enlarged detail of a portion of FIG. 1.
Figure 2:
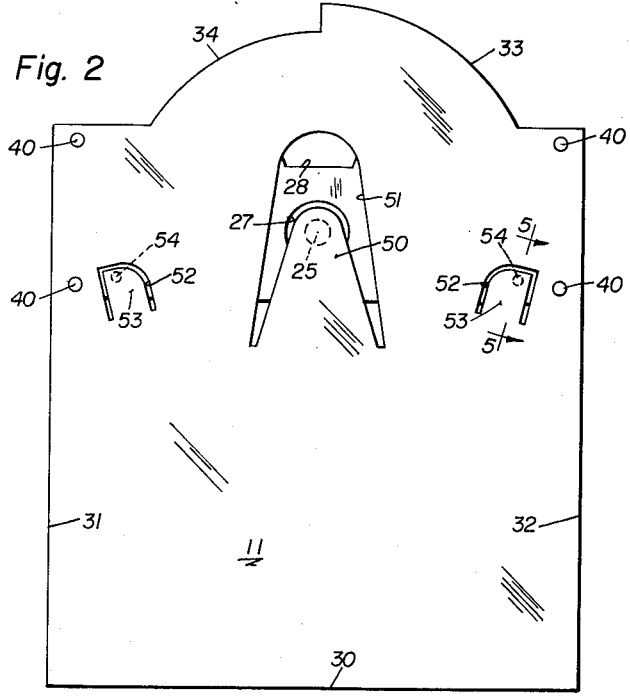
FIG. 2 is a rear view of the viewer in collapsed condition.

When the lens housing is collapsed, a central tab 65 projecting beyond the lower edge of the plate 14 is received in a notch 66 in the lower edge flange 37 of member 11. The outer surface of the flange 36 beneath the notch 66 is inwardly recessed so that a fingernail or the tip of a finger may engage the tab to start the collapsed housing upwardly toward its operative position. As seen in FIGS. 1 and 4, the width of the housing is slightly less than the lateral spacing between the flanges 37 and 38. The end edges of plates 14 are provided with a pair of laterally opposed, narrow projections 67 which engage narrow inward projections 68 on the inner surfaces of the flanges 37 and 38. The distance between the lateral edges of projections 67 is slightly greater than the distance between projections 68 so that when the lens housing is thus collapsed, the portions of the plate 14 surrounding the projections 67 may be pressed inwardly, causing the portions of the flexible flanges 37 and 38 surrounding the projections 68 to spread laterally whereby the projections 67 and 68 are frictionally engaged with each other to hold the device in collapsed condition with all of the plates parallel to each other. In this position the lens housing is collapsed within the flanges 36, 37 and 38 on the rear carrier member 11.

The plate 14 is provided with a pair of slots 70 extending inwardly from its lower edge at the sides of the tab 65. A groove 71 in the outer surface of the plate 14 between the inner ends of slots 70 receives one bight 72 of an endless rubber band stretched within the lens housing. The sides of the tab 65 at the inner ends of the grooves 70 are also inwardly recessed and the slots 70 are narrower than the diameter of the band in relaxed condition so that the band is firmly retained. The outer surface of the band does not materially project beyond the surface of the plate 14.

Figure 11:
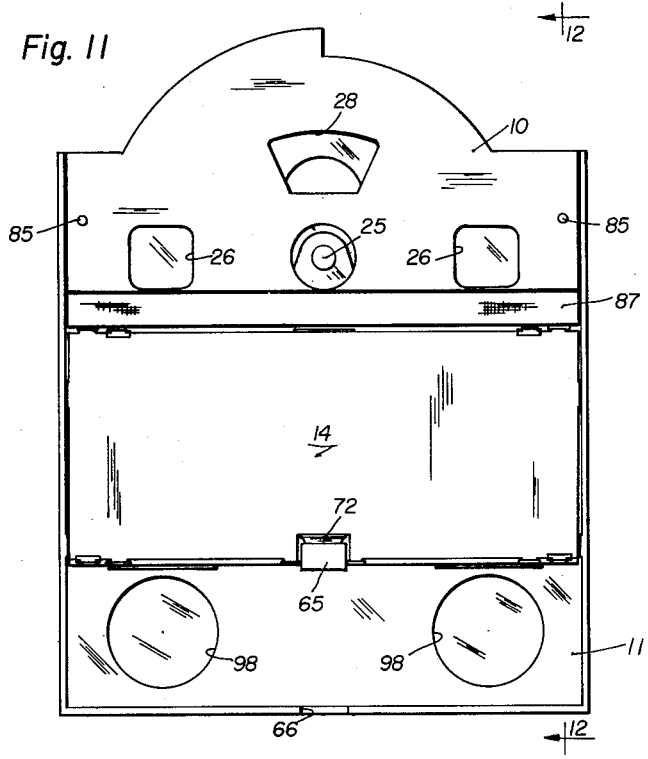
FIG. 11 is a front view of the viewer in the first position of transposition of the parts from collapsed to operative position.
Figure 12:
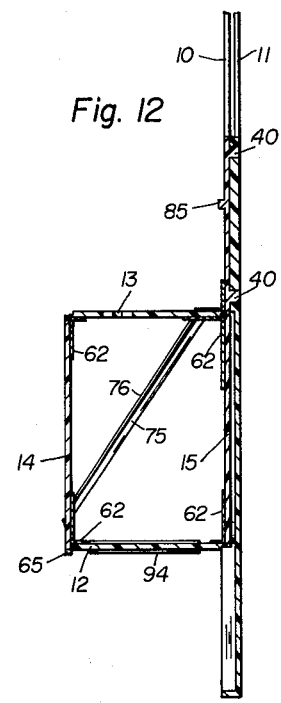
FIG. 12 is a vertical section taken substantially along line 12—12 of FIG. 11.
Figure 15:
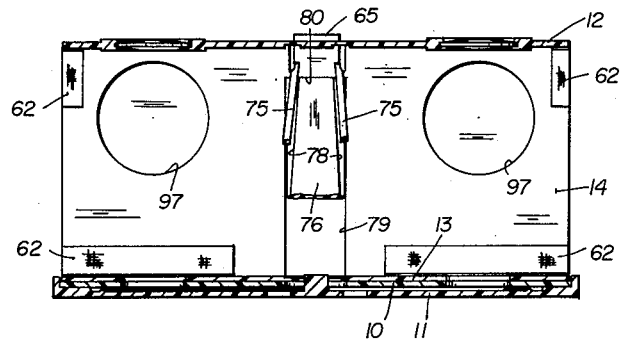
FIG. 15 is a horizontal section taken substantially along line 15—15 of FIG. 13.

The opposite edge of the plate 13 is provided with similar slots and an adjoining groove defining a tongue 73, the end of which is recessed from the major portion of the edge of the plate so that the opposite bight 74 of the endless rubber band may be positioned and retained with its outer surface practically flush with the surface of the plate 13. The reach portions 75 of the rubber band incline toward each other from the tab 73 toward the tab 65 due to the fact that the tab 73 is substantially wider than the tab 65. The reach portions of the rubber band underlie a rectangular brace member 76 which is pivotally fastened to the inner surface of plate 13 adjacent the junction thereof with plate 15 by means of an adhesive fabric tape 77 (FIG. 6). The longitudinal edges of the brace member 76 are rabbeted as indicated at 78. The adjacent inner surface of plate 14 is provided with a rectangular groove 79 (FIG. 15) of the same width as the brace 76, and which terminates in a transverse abutment edge 80. The adjacent inner surface of plate 15 is provided with a similar rectangular groove 81 (FIG. 7) and portions of plates 12 and 13 are similarly recessed (FIG. 10) so that the flights 75 of the rubber band and the brace 76 are receivable within the adjacent grooves whereby the lens housing may be collapsed with the plates flush against each other. The flights of the rubber band raise the tip of the brace 76 and hold it within the groove 79 as the housing is extended, the brace being thereby guided into engagement with the abutment 80 when the housing assumes its rectangular shape. The rubber band is under tension at all times so that when a person pushes upwardly and rearwardly on the tab 65 the housing snaps into a rectangular position and is held in braced condition thereby, with the brace 76 engaging the abutment 80 to limit such motion. The rubber band therefore automatically extends the lens housing from its collapsed position illustrated in FIGS. 1 and 3, to its extended condition as illustrated in FIGS. 11 and 12.

The rear plate 13 is provided with means, which cooperate with aligned means on the front member 10, for holding the extended housing in its operative position as illustrated in FIGS. 13 and 14. Such means include openings in the plate 13 (to be described) and lugs 85 on the member 10 which are received in and frictionally engage the openings in the plate 13. Each opening which receives a lug is provided by slight enlargements of a central slot of several slots defining a pair of bridges 86 (FIG. 16) which are capable of springing apart slightly in order firmly to grip the lugs 85 when the surrounding portions of plate 13 are pressed against the surface of member 10. The housing may be released from its operative position by pressing downwardly upon the upper surface of the top plate 14, whereupon the housing will fall against carrier holding member 11, as illustrated in FIGS. 11 and 12. Thereafter downward pressure against the adjacent edges of plates 12 and 14 will collapse the housing so that it may be positioned in collapsed condition against member 11. The housing is hingedly connected to the lower edge of front member 10 by means of a strip of adhesive fabric indicated at 87.

The rear plate 13 of the lens housing is provided with a pair of viewing openings 90 which register with the viewing openings 26 in member 10 when the housing is in operative position. The plate 13 is also provided with a small opening 91 (FIG. 1) which registers with the tip of the spindle lug 25 when the housing is in operative position. The lugs 85 and the portions of plate 13 which receive them, and the lug 25 received in the opening 91, provide means accurately to dispose a pair of lenses 96 in optical alignment with the transparencies.

When the device is collapsed the viewing openings 90 receive the high portions 46 of the concentric rib 45 on member 11 (FIG. 1). As can be seen most clearly in FIG. 6, the bottom plate 15 has an upper arcuate edge which is concentrically disposed with respect to the spindle 25 when the plate lies flush against member 11.

The lens housing plate 12 is provided with a pair of thickened lens mounting bezels 94 in which are suitably retained a pair of viewing lenses 96. The inner surface of housing plate 14 is provided with a pair of recesses 97 (FIG. 8) adapted to receive the bezels 94 so that the plates 12 and 14 may be collapsed against each other. The forward surface of the rear member 11 is provided with a similar pair of depressions 98 (FIG. 13) so as to receive the bezels 94 when the viewer is collapsed.

The lower edge of the lens housing plate 12 is provided with a central recess 99 (FIG. 13) and the forward edge of the bottom plate 15 is provided with a matching recess 100 (FIG. 6) which together provide a notch in the lower forward edge of the extended lens housing to accommodate the bridge of the user's nose when he is observing the transparencies.

Having illustrated and described a preferred form of the present invention, it should be obvious to those skilled in the art that the same permits modifications in arrangement and detail. All such modifications as come within the true spirit and scope of the appended claims are considered to be a part of my invention.

I claim:
1. A collapsible stereoscopic viewer for viewing a stereo-pair of transparencies mounted in a flat carrier, said viewer comprising a carrier holding portion including a pair of molded plastic, platelike members including a front member and a rear member secured together in parallel relation and defining a slot therebetween for receiving said carrier, and a collapsible, lens-carrying housing of rectangular cross section when erected hingedly secured to said carrier holding portion, said housing comprising four molded plastic, rectangular plates hingedly secured to each other along their adjacent edges, lens means carried by one of the plates, apertures in one of the plates optically aligned with said lens means, said housing being secured to said carrier holding portion along the junction of two of said plates, a plurality of hinge means respectively securing said plates together and said housing to said carrier holding portion in such manner that the housing may be opened into extended condition with adjacent plates at right angles with respect to each other and said lens carrying plate perpendicular to the plane of said members, and thereafter swung into an operative position in which the lens means are optically aligned with such a stereo-pair of transparencies, said hinge means permitting said housing to be collapsed and swung into a storage position lying flush against said carrier holding portion, means to maintain said housing in said extended condition with said plates at right angles to each other, and means releasably to maintain said housing in said operative position when erected.

2. A collapsible stereoscopic viewer for viewing a stereo-pair of transparencies mounted in a flat carrier, said viewer comprising a carrier holding portion including a pair of molded plastic, platelike members including a front member and a rear member secured together in parallel relation and defining a slot therebetween for receiving said carrier, said front member having a linear lower edge, said rear member having a lower portion extending below said lower edge, and a collapsible, lens-carrying housing of rectangular cross section when erected hingedly secured along a line parallel to and adjacent said lower edge, said housing comprising four molded plastic, rectangular plates hingedly secured to each other along their adjacent edges, said plates comprising in their operative position a front plate, a top plate, a rear plate and a bottom plate, lens means carried by said front plate, said rear plate having a pair of openings optically aligned with the lens means and alignable with such a stereo-pair of transparencies, said housing being secured to said members along the junction of said rear and bottom plates, a plurality of hinge means respectively securing said plates together and said housing to said members in such manner that the housing may be opened into extended condition with adjacent plates at right angles with respect to each other and said lens carrying plate perpendicular to the plane of said members, and thereafter swung into an operative position with said front plate adjacent and parallel to said front member with said lens means aligned with such a stereo-pair of transparencies, said hinge means permitting said housing to be collapsed and swung into a storage position adjacent and parallel to said lower portion of the rear member, means to maintain said housing in said extended condition with said plates at right angles to each other, and means releasably to maintain said housing in said operative position when erected.

3. The construction set forth in claim 2 wherein said means to maintain said housing in said extended condition with said plates at right angles to each other comprises a rigid brace hingedly connected at one end to said rear plate within said housing and adjacent the junction of said rear plate with said bottom plate, an abutment on said top adjacent the junction of said top plate with said front plate adapted to engage the opposite end of said brace when said brace extends diagonally across the interior of said housing, and a rubber band tensioned between said two junctions.

4. The construction set forth in claim 2 wherein said means to maintain said housing in said extended condition with said plates at right angles to each other comprises a rigid brace hingedly connected at one end to one of said plates within said housing and adjacent the junction of a first pair of said plates, an abutment on one of the other pair of said plates adjacent the junction thereof diagonally opposite the junction of said first pair of plates and adapted to engage the opposite end of said brace when said brace extends diagonally across the interior of said housing, and a rubber band tensioned between said junctions, said rubber band being arranged to support and guide said free end of the brace into engagement with said abutment.

5. A collapsible sterescopic viewer as set forth in claim 2 wherein said rear member lower portion defines a shallow, forwardly opening, cup-shaped recess,
said recess receiving and encompassing said housing when the latter is swung into said storage position.

References Cited in the file of this patent

UNITED STATES PATENTS

| | | |
|---|---|---|
| 2,685,963 | Loerinc | Aug. 10, 1954 |
| 2,872,844 | Van Tuyl | Feb. 10, 1959 |
| 2,986,830 | Underberg et al. | June 6, 1961 |
| 3,005,378 | Golden | Oct. 24, 1961 |